United States Patent
Zhang et al.

(10) Patent No.: US 11,149,152 B2
(45) Date of Patent: Oct. 19, 2021

(54) DURABLE HYDROPHILIC-SUPER-HYDROPHOBIC BIPOLAR SELF-CLEANING COMPOSITE FILM, AND PREPARATION METHOD THEREFOR

(71) Applicant: South China University of Technology, Guangzhou (CN)

(72) Inventors: Lizhi Zhang, Guangzhou (CN); Jinghui Zhi, Guangzhou (CN)

(73) Assignee: South China University of Technology, Guangzhou (CN)

(*) Notice: Subject to any disclaimer, the term of this patent is extended or adjusted under 35 U.S.C. 154(b) by 180 days.

(21) Appl. No.: 16/309,357

(22) PCT Filed: Oct. 24, 2017

(86) PCT No.: PCT/CN2017/107461
§ 371 (c)(1),
(2) Date: Dec. 12, 2018

(87) PCT Pub. No.: WO2018/133469
PCT Pub. Date: Jul. 26, 2018

(65) Prior Publication Data
US 2020/0308421 A1    Oct. 1, 2020

(30) Foreign Application Priority Data

Jan. 18, 2017   (CN) .......................... 201710036759.9

(51) Int. Cl.
| | | |
|---|---|---|
| C09D 5/16 | (2006.01) | |
| B05D 1/18 | (2006.01) | |
| B05D 3/02 | (2006.01) | |
| B05D 3/10 | (2006.01) | |
| B05D 7/00 | (2006.01) | |
| C08K 3/34 | (2006.01) | |
| C08K 5/17 | (2006.01) | |
| C08K 5/544 | (2006.01) | |
| C09D 183/06 | (2006.01) | |

(52) U.S. Cl.
CPC .............. *C09D 5/1681* (2013.01); *B05D 1/18* (2013.01); *B05D 3/0254* (2013.01); *B05D 3/104* (2013.01); *B05D 7/536* (2013.01); *C08K 3/34* (2013.01); *C08K 5/17* (2013.01); *C08K 5/544* (2013.01); *C09D 5/1675* (2013.01); *C09D 183/06* (2013.01); *B05D 2203/35* (2013.01); *B05D 2401/10* (2013.01); *B05D 2518/12* (2013.01); *C08K 2201/005* (2013.01); *C08K 2201/011* (2013.01)

(58) Field of Classification Search
CPC ...... C09D 5/1675; C09D 5/1681; C09D 7/67; C09D 7/69; C09D 183/06
See application file for complete search history.

(56) References Cited

U.S. PATENT DOCUMENTS

| | | | |
|---|---|---|---|
| 6,506,921 B1* | 1/2003 | Wilkes ................ | C08G 59/306 |
| | | | 427/387 |
| 2013/0064990 A1 | 3/2013 | Lu et al. | |
| 2017/0145251 A1* | 5/2017 | Ogawa ................ | H01L 23/296 |

FOREIGN PATENT DOCUMENTS

| | | |
|---|---|---|
| CN | 101962514 A | 2/2011 |
| CN | 104745045 A | 7/2015 |
| CN | 105499092 A | 4/2016 |
| CN | 105602412 A | 5/2016 |
| CN | 106862039 A | 6/2017 |
| WO | 2007090808 A1 | 8/2007 |
| WO | 2015/161233 A1 | 10/2015 |

OTHER PUBLICATIONS

Abstract for CN 105001600 (no date).*
Abstract for KR 1772549 (no date).*
Abstract for CN 101429350 (no date).*
Abstract for CN 106700927 (no date).*
International Search Report.

* cited by examiner

*Primary Examiner* — Marc S Zimmer
(74) *Attorney, Agent, or Firm* — Fishman Stewart PLLC

(57) ABSTRACT

The present invention belongs to the field of super-hydrophobic surface technology, and discloses a durable hydrophilic-super-hydrophobic bipolar self-cleaning composite film and a preparation method therefor. The preparation method is as follows: adding an epoxy silane coupling agent into an organic solvent; after stirring and mixing well, adding an amine curing agent and distilled water to the mixture; stirring and adding micron-sized solid particles and hydrophobic nano silicon dioxide particles; continuing stirring to obtain a hydrophilic layer solution; adding a hydrophobic modifier and a hydrophilic nano silicon dioxide particles into the solvent to obtain a hydrophobic layer solution; coating a pretreated substrate surface with the hydrophilic layer solution, and performing heating treatment at 60° C. to 80° C. for 10-50 min; then coating the surface with the hydrophobic layer solution, and performing heating treatment at 100° C. to 140° C. for 50-90 min to obtain the durable hydrophilic-super-hydrophobic bipolar self-cleaning composite film. The preparation method of the present invention is simple, and the super-hydrophobic surface of the obtained composite film has strong mechanical durability and a good industrial application prospect.

10 Claims, 5 Drawing Sheets

DURABLE HYDROPHILIC-SUPER-HYDROPHOBIC BIPOLAR SELF-CLEANING COMPOSITE FILM, AND PREPARATION METHOD THEREFOR

CROSS-REFERENCE TO RELATED APPLICATION

This application claims priority to China Patent Application No. CN2017/10036759.9 filed on Jan. 18, 2017 and an International Application No. PCT/CN2017/107461 filed Oct. 24, 2017, both of which are hereby incorporated by reference in their entirety.

FIELD OF THE DISCLOSURE

The present disclosure belongs to the field of super-hydrophobic surface technology, and in particular relates to a durable hydrophilic-super-hydrophobic bipolar self-cleaning composite film and a preparation method therefor.

BACKGROUND OF THE DISCLOSURE

With the self-cleaning mechanism of the lotus leaf surface discovered, the special infiltration phenomenon of the interface has attracted wide interest of researchers. A super-hydrophobic surface has many unique advantages in the interface phenomenon, e.g. self-cleaning, anti-oil, anti-corrosion, anti-condensation, anti-frosting, etc., due to a large contact angle (≥150°) and a small rolling angle (≤10°) of spherical water droplets thereon. Therefore, the study of the preparation of super-hydrophobic surfaces has very important practical significance and broad application prospects.

In recent years, methods for preparing super-hydrophobic surfaces have emerged rapidly, but the super-hydrophobic surfaces prepared by most methods have poor durability. In actual production and life, the surface will be inevitably affected by various external forces. At present, the main obstacle that prevents the super-hydrophobic surfaces from being widely used in industrial production and life is that their poor mechanical durability makes them unable to withstand various external forces.

Scientists have worked to improve the durability of the super-hydrophobic surfaces. For example, CN101962514A disclosed a long-durability super-hydrophobic self-cleaning coating material and a preparation method therefor, by which method the material was prepared from photocatalytically active nanoparticles, low surface-free-energy polymer and a crosslinking agent. By this method, however, fluorinated polysiloxane had to be used for the low surface-free-energy polymer, with the fluoride expensive and high in use cost; besides, the bonding between the coating and the substrate was not explained; moreover, the mechanical properties of the coating were not detected. CN105602412A disclosed a method for preparing a wear-resistant super-hydrophobic nano-titanium dioxide coating, by which a silane coupling agent and an epoxy resin were used to fix hydrophobically modified titanium dioxide particles. However, the preparation process had a long period, with only the film drying process taking about 8-10 h; the prepared super-hydrophobic surface had a contact angle of only about 150°, and the super-hydrophobic effect was not particularly good; the friction test only used the change in mass to indicate the wear resistance and could not well make sense. Zhu et al. embedded carbon nanotubes in a polytetrafluoroethylene template under high temperature and high pressure. Since both polytetrafluoroethylene and carbon nanotubes were hydrophobic materials, and carbon nanotubes in polytetrafluoroethylene could play a role in roughing the structure, the super-hydrophobic surface thus produced was enhanced in durability. The surface could withstand about 20 times of wear of about 5.6 kPa external force, and the contact angle of the surface was reduced from about 159° to 152°, with a certain degree of super-hydrophobicity still maintained. Wong et al. sprayed a hydrophobic nano silicon dioxide onto a polyurethane colloid to prepare a mechanically durable super-hydrophobic surface, which could withstand about 120 cycles of wear while remaining the super-hydrophobic state. Although these methods all enhance the interaction between a rough structure and a low surface-energy material to a certain extent, the acting force between the super-hydrophobic film layer and the substrate has not been increased, and the shortcoming that the super-hydrophobic surface is poor in durability has not been overcome.

Contents of the Disclosure

In order to overcome the above shortcomings and deficiencies of the prior art, a feature of the present disclosure is to provide a method for preparing a durable hydrophilic-super-hydrophobic bipolar self-cleaning composite film.

Another feature of the present disclosure is to provide a durable hydrophilic-super-hydrophobic bipolar self-cleaning composite film prepared by the above method.

The aspects of the present disclosure may be achieved by the following exemplary technical solution:

A method for preparing a durable hydrophilic-super-hydrophobic bipolar self-cleaning composite film may comprise one or more of the following steps:

(1) adding an epoxy silane coupling agent into an organic solvent; after stirring and mixing well, adding an amine curing agent and distilled water to the mixture; stirring for about 20-50 min and adding micron-sized solid particles and hydrophobic nano $SiO_2$ particles; continuing stirring for about 1-3 h to obtain a hydrophilic layer solution;

(2) adding a hydrophobic modifier and a hydrophilic nano $SiO_2$ particles into the solvent, and stirring and mixing well to obtain a hydrophobic layer solution; and (3) coating a pretreated substrate surface with the hydrophilic layer solution prepared in the step (1), and performing heating treatment at about 60° C. to 80° C. for about 10-50 min; then coating the surface with the hydrophobic layer solution obtained in the step (2), and performing heating treatment at about 100° C. to 140° C. for about 50-90 min to obtain the durable hydrophilic-super-hydrophobic bipolar self-cleaning composite film.

The epoxy silane coupling agent in the step (1) refers to an organosilane compound containing an epoxy group and at least one group selected from a methoxy group, an ethoxy group, a chloro group, and an acetoxy group. Specific examples of the compounds include γ-glycidyloxypropyltrimethoxysilane, 3-(2,3-epoxypropoxy) propyltriethoxysilane, 2-(3,14-epoxy cyclohexyl) ethyltrimethoxysilane and the like. The hydrolyzable group in the epoxy silane coupling agent undergoes a covalent bonding reaction with the substrate after hydrolysis, the epoxy functional group undergoes a covalent crosslinking reaction with the amine curing agent to form a three-dimensional network structure to bond and wrap the solid particles, and a new functional group can be formed for a covalent bonding reaction with the subsequently applied hydrophobic layer solution.

The organic solvent may be at least one of methanol, ethanol, and isopropyl alcohol.

The amine curing agent described in the step (1) may be at least one of octadecylamine, ethylenediamine, hexamethylenediamine, diethylenetriamine, and triethylenetetramine.

The micron-sized solid particles in the step (1) may be at least one of micron-sized silicon dioxide, aluminum oxide, zinc oxide, and corundum.

The parts by weight of each material in the step (1) may be as follows: about 2-5 parts of the epoxy silane coupling agent, about 20-50 parts of the organic solvent, about 0.5-3 parts of the amine curing agent, about 0.5-3 parts of the distilled water, about 0-0.5 part of the micron-sized solid particles, and about 0.2-0.6 part of the hydrophobic nano $SiO_2$ particles.

The temperature may be maintained in the range of about 25° C. to 40° C. during the preparation of the hydrophilic layer solution in the step (1).

The hydrophobic modifier in the step (2) may be at least one of hexamethyldisilazane, trimethylchlorosilane, dimethyldichlorosilane, methyltrichlorosilane, methyltrimethoxysilane, and methyltriethoxysilane. The solvent is at least one of methanol, ethanol, propylene glycol, isopropanol, isobutanol, butanol, glycerin, and tetrahydrofuran.

The parts by weight of each material in the step (2) may be as follows: about 2-6 parts of the hydrophobic modifier, about 10-50 parts of the solvent, and about 0.05-0.3 part of the hydrophilic nano $SiO_2$ particles.

The substrate in the step (3) may be selected from glass, iron, copper, aluminum, cement and the like; the pretreatment comprises ultrasonic cleaning in a mixture of ethanol and acetone followed by washing with deionized water and drying.

Thus a durable hydrophilic-super-hydrophobic bipolar self-cleaning composite film may be obtained by one or more steps as set forth in the above method.

The principle of the present disclosure may be described generally as follows:

The super-hydrophobic surface prepared by the hydrophilic-super-hydrophobic bipolar composite film can achieve the stability of the microstructure and the durability of the low surface-energy material. In the two-layer film, the hydrophilic layer, acting as a linking layer, uses an organic material containing two functional groups with different properties to bond together with the substrate and the hydrophobic layer by a covalent bond, thereby reinforcing the resistance of the film to external mechanical forces. The microstructure of the film layer consists of micron-sized solid particles dispersed in a hydrophilic layer, and the solid particles are tightly bonded together by an adhesive in the hydrophilic layer rather than being loosely stacked therein, thereby enhancing the robustness of the microstructure. The hydrophobic layer and the hydrophilic layer are bonded together by a covalent bond to enhance the durability of the low surface-energy material. Thus, the durability of the prepared super-hydrophobic surface is greatly enhanced. The film, having both a hydrophilic group and a hydrophobic group, is capable of being super-hydrophobic and closely bonded to an underlayer by a covalent bond, thus called a bipolar film. For a glass substrate, the schematic diagrams of the covalent bonding reaction between the hydrophilic layer and the substrate and the covalent bonding reaction between the hydrophilic layer and the hydrophobic layer of the present disclosure are respectively shown in general in FIGS. 1 and 2; the schematic structural diagram of the obtained hydrophilic-super-hydrophobic self-cleaning composite film is shown in FIG. 3. It will be appreciated that the results may be similar when the substrate is made of other materials, all of which is within the scope of this disclosure.

The preparation method and the obtained product of the present disclosure, may have the following advantages and beneficial effects:

(1) The preparation process of the present disclosure is simple, requires neither expensive equipment nor expensive experimental reagents, and, utilizes drying of the coating film; and (2) The super-hydrophobic surface of the hydrophilic-super-hydrophobic bipolar composite film obtained by the present disclosure has good long-term stability and strong mechanical durability; the hydrophilic-super-hydrophobic bipolar composite film obtained by the present disclosure achieves the self-cleaning effect after it is soaked in water for up to 4 days; it can withstand about 180 friction cycles under a weight of about 20 g, a sandpaper of about 1200 mesh and a single friction distance of about 17 cm, and has good industrial application prospects.

DETAILED DESCRIPTION OF THE EMBODIMENTS

The present disclosure will be further described in detail below with reference to examples and accompanying drawings, but the embodiments of the present disclosure are not limited thereto. It will be appreciated that the examples presented herein may include more or fewer steps and materials.

Example 1

(1) A glass slide was placed in a beaker so as to be placed in an ultrasonic cleaner to get cleaned ultrasonically at about 70 Hz in turn with ethanol, acetone and deionized water for about 20 min, and was finally taken out to be blown dry by a dryer to get ready for use.

(2) 3 parts by weight of γ-glycidyloxypropyltrimethoxysilane were added to a beaker containing about 32 parts of an ethanol solution to undergo magnetic stirring in a water bath at a constant temperature of about 30° C. for 1 h; the beaker was taken out of the water bath, 1 part of deionized water and then 1 part of octadecylamine were added to the beaker, and the beaker continued to be stirred in a water bath at a constant temperature until the solid was completely dissolved; the beaker was taken out of the water bath, and about 0.2 part of micron-sized silicon dioxide particles and about 0.4 part of hydrophobic nano silicon dioxide particles (Aladdin Reagent) were added to the beaker, which then continued to be stirred at a constant temperature for about 2 h.

(3) 4 parts of hexamethyldisilazane were added to the beaker by a measuring cylinder, about 10 parts of an ethanol solution and about 0.05 part of hydrophilic nano silicon dioxide particles with a particle size of 7-40 nm (Aladdin Reagent) were then added to the beaker, and the beaker was magnetically stirred for about 30 min.

(4) The solution prepared in the step (2) was dripped on the cleaned glass slide that, after the coating film was uniform, was then placed in an oven to get dried at about 80° C. for about 30 min to evaporate the ethanol, thereby obtaining a hydrophilic film layer.

(5) After the glass slide prepared in the step (4) was taken out, the solution prepared in the step (3) was also applied to the hydrophilic film layer by a drip coating method, and then the sample was placed in an oven at about 140° C. to get dried for about 80 min, thereby obtaining the hydrophilic-super-hydrophobic bipolar composite film of this example. Under such conditions, the ethanol on the surface of the sample volatilized, and the dehydration condensation between the hydrophilic layer and the substrate and between the hydrophilic layer and the hydrophobic layer formed a covalent bond, enhancing the ability of the super-hydrophobic surface to resist external forces.

Figure 1:
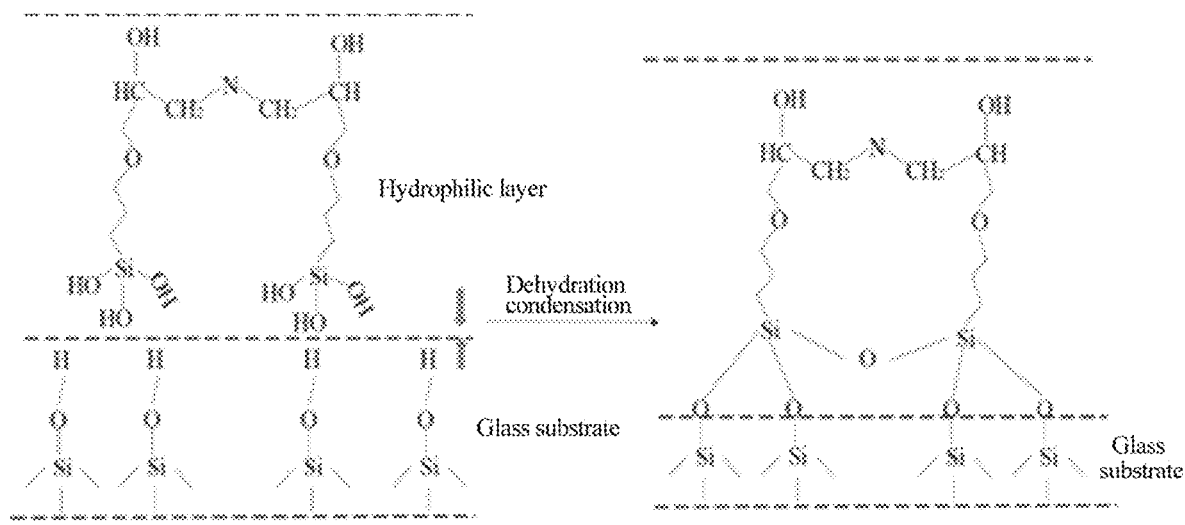
FIGS. 1 and 2 are schematic diagrams showing a covalent bonding reaction between a hydrophilic layer and a substrate and a covalent bonding reaction between a hydrophilic layer and a hydrophobic layer of the present disclosure when the substrate is glass.
Figure 2:
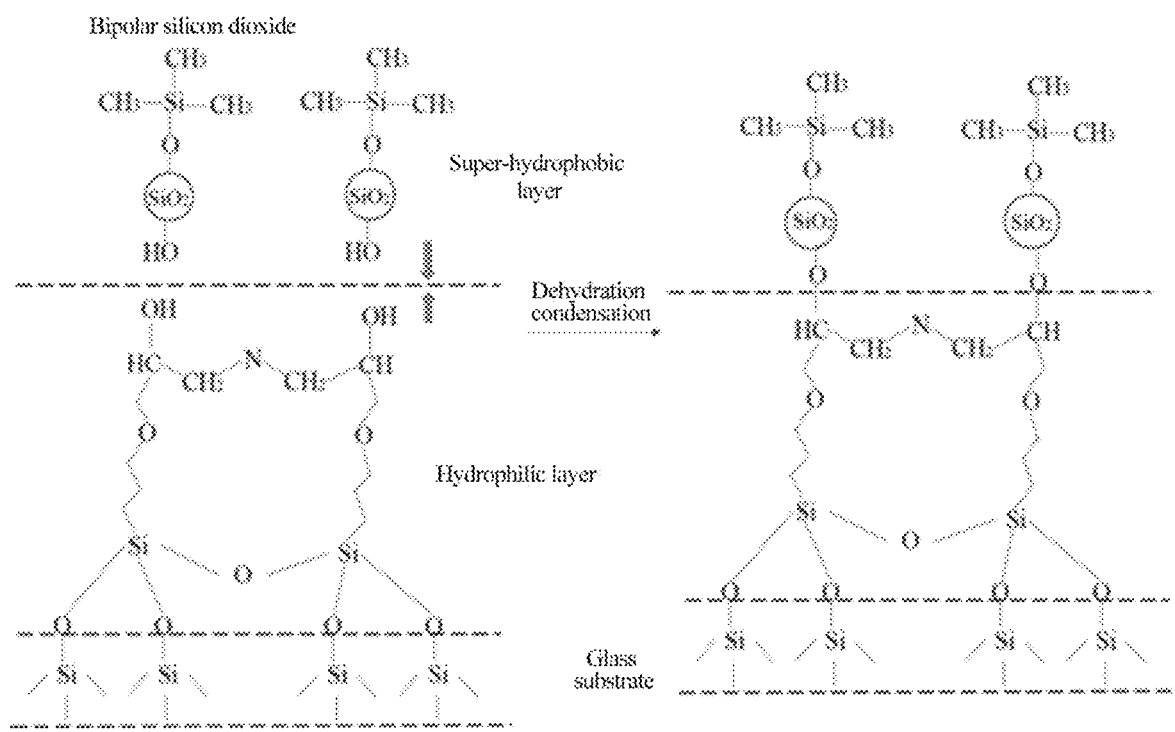
Figure 3:
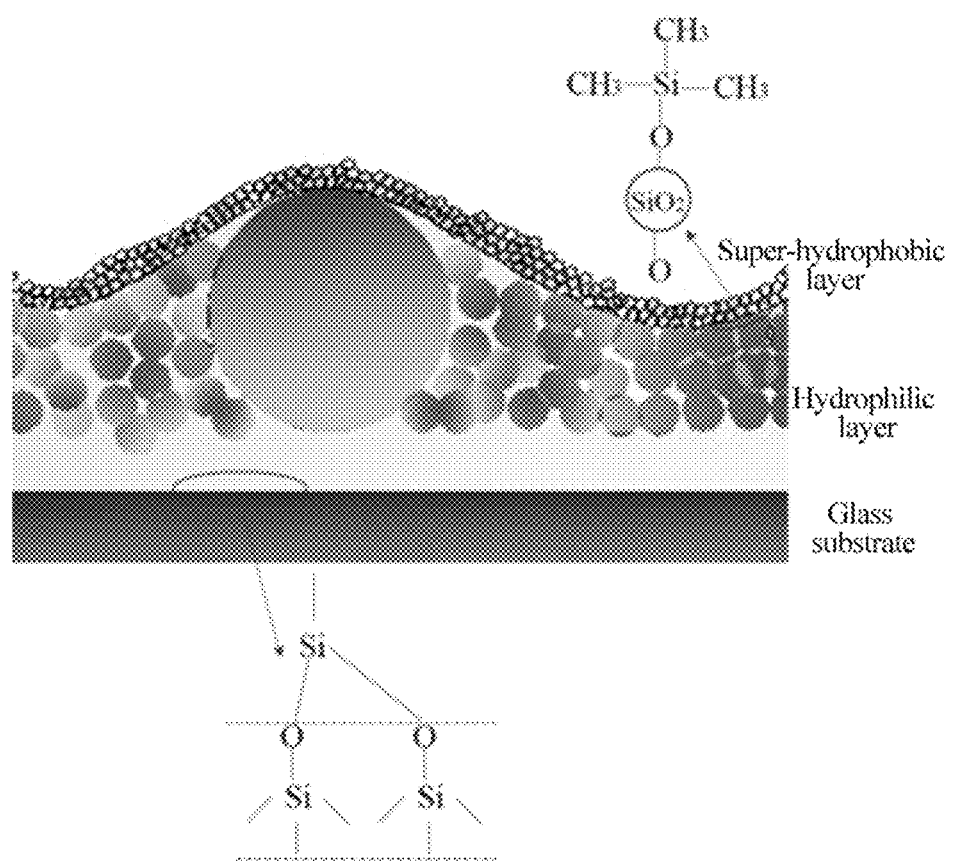
FIG. 3 is a schematic structural diagram of the hydrophilic-super-hydrophobic self-cleaning composite film of the present disclosure when the substrate is glass.
Figure 4:
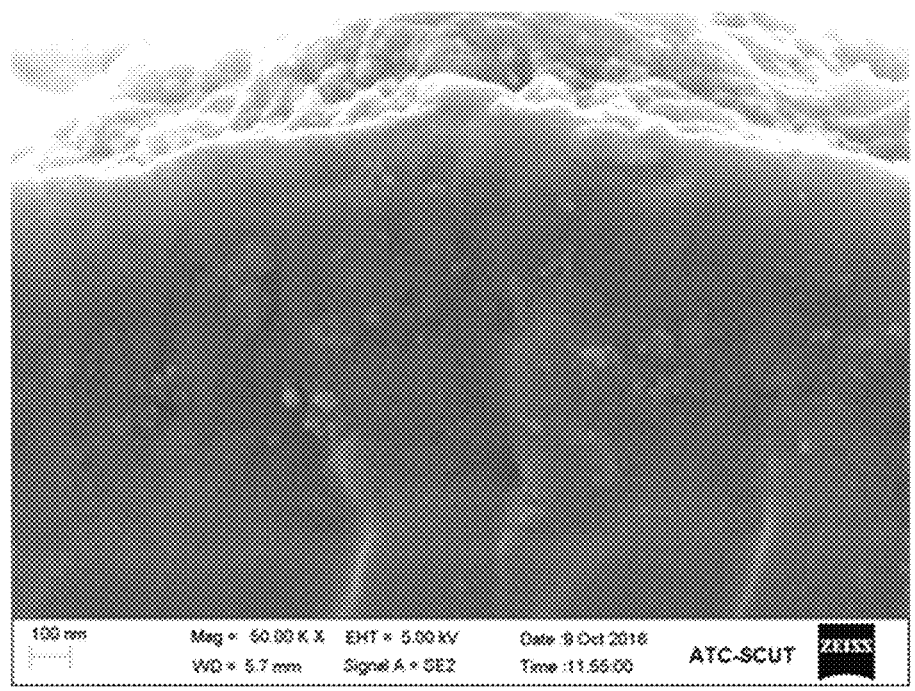
FIG. 4 is a scanning electron micrograph of a hydrophilic-super-hydrophobic self-cleaning composite film obtained in Example 1 of the present disclosure.
Figure 5:
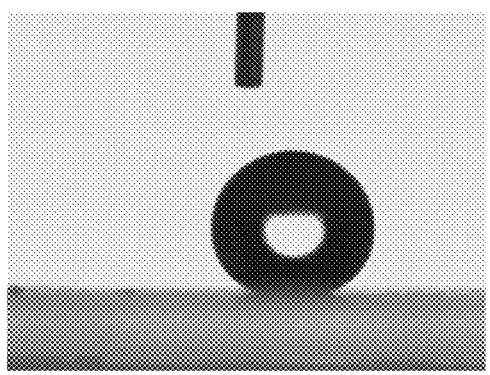
FIG. 5 is a graph showing the results of contact angle test of the hydrophilic-super-hydrophobic self-cleaning composite film obtained in Example 1 of the present disclosure.

A scanning electron micrograph of the hydrophilic-super-hydrophobic self-cleaning composite film obtained in this example was shown in FIG. 4; and the contact angle test results thereof were shown in FIG. 5.

The durability and the wettability of the hydrophilic-super-hydrophobic self-cleaning composite film obtained in this example were tested according to the following specific test steps: Durability was tested by sanding: A sample was placed on a sandpaper of about 1200 mesh and tested at a wear distance of about 17 cm each under a weight of about 20 g. Wettability: The contact angle was measured by a contact angle meter of Dataphysics OCA 2.0, and the rolling angle was measured by a laboratory-made device. The contact angle and the rolling angle were measured after every 5 wear tests. The contact angle and the rolling angle were tested at 5 different points of the sample each time, and the average was taken as the test result.

Figure 6:
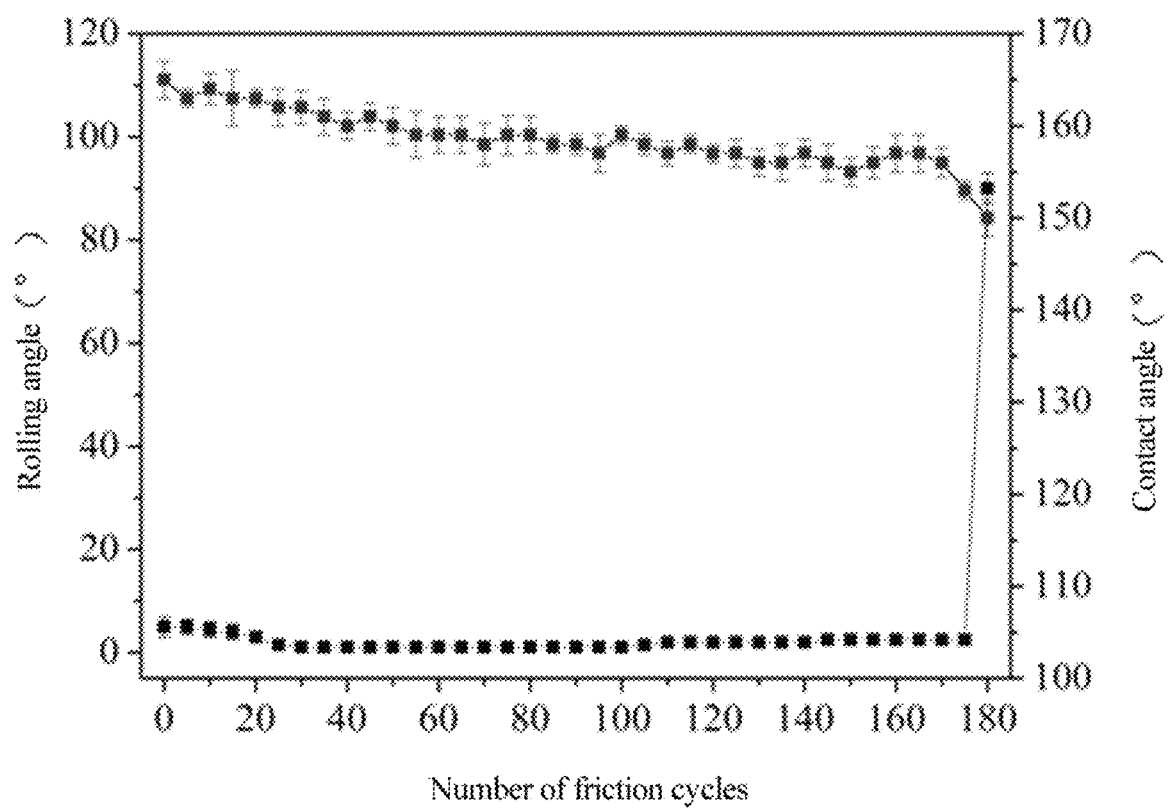
FIG. 6 is a graph showing the relationship between durability and wettability of the hydrophilic-super-hydrophobic self-cleaning composite film obtained in Example 1 of the present disclosure.

The relationship between the durability and the wettability of the obtained hydrophilic-super-hydrophobic self-cleaning composite film was shown in FIG. 6.

From the above results, it can be seen that the super-hydrophobic surface prepared by the present disclosure could withstand about 180 times of friction loss while maintaining its super-hydrophobicity. During the friction test, the contact angle of the surface changed from 166° to the final 150°, and the rolling angle changed from the initial 2° to a small change in the friction test, and then to being rapidly over about 90° after being subjected to about 180 times of wear, indicating that there was a strong bonding force between the coating and the substrate, which was broken after a certain abrasion, such that the coating was detached from the surface to result in loss of the super-hydrophobicity of the surface.

Example 2

(1) An aluminum sheet that had been subjected to surface blasting was placed in a beaker so as to be placed in an ultrasonic cleaner to get cleaned ultrasonically at about 60 Hz in turn with ethanol, acetone and deionized water for about 10 min, and then it was taken out to be blown dry by a dryer to get ready for use.

(2) 5 parts by weight of 3-(2,3-epoxypropoxy)propyltriethoxysilane were added to a beaker containing 32 parts of an ethanol solution to undergo magnetic stirring in a water bath at a constant temperature of about 35° C. for about 1 h; the beaker was taken out of the water bath, about 0.5 part of deionized water and then 2 parts of octadecylamine were added to the beaker, and the beaker continued to be stirred in a water bath at a constant temperature; the beaker was taken out, about 0.6 part of hydrophobic nano silicon dioxide particles were added to the beaker, and the beaker continued to be stirred at a constant temperature for about 2 h.

(3) 4 parts of hexamethyldisilazane were added to the beaker by a measuring cylinder, about 10 parts of an ethanol solution and about 0.1 part of hydrophilic nano silicon dioxide particles with a particle size of about 7-40 nm were then added to the beaker, and the beaker was magnetically stirred for about 30 min.

(4) The solution prepared in the step (2) was dripped on the cleaned aluminum sheet that, after the coating film was uniform, was then placed in an oven to get dried at about 80° C. for about 30 min to evaporate the ethanol, thereby obtaining a hydrophilic film layer.

(5) After the aluminum sheet prepared in the step (4) was taken out, the solution prepared in the step (3) was also applied to the hydrophilic film layer by a drip coating method, and then the sample was placed in an oven at about 140° C. to get dried for about 60 min, thereby obtaining the hydrophilic-super-hydrophobic bipolar composite film of this example. Under such conditions, the ethanol on the surface of the sample volatilized, and the dehydration condensation between the hydrophilic layer and the substrate and between the hydrophilic layer and the hydrophobic layer formed a covalent bond, enhancing the ability of the super-hydrophobic surface to resist external forces.

Example 3

(1) An iron sheet that had been subjected to surface blasting was placed in a beaker so as to be placed in an ultrasonic cleaner to get cleaned ultrasonically at about 60 Hz in turn with ethanol, acetone and deionized water for about 10 min, and then it was washed with a mixed solution (pH=about 12) of sodium hydroxide and sodium nitrite as an alkali washing solution, and finally taken out to be blown dry by a dryer to get ready for use.

(2) 2 parts by weight of γ-glycidyloxypropyltrimethoxysilane were added to a beaker containing about 32 parts of an ethanol solution to undergo magnetic stirring in a water bath at a constant temperature of about 30° C. for about 1 h; the beaker was taken out of the water bath, 3 parts of deionized water and then 1 part of triethylenetetramine were added to the beaker, and the beaker continued to be stirred in a water bath at a constant temperature until the solid was completely dissolved; the beaker was taken out, about 0.2 part of hydrophobic nano silicon dioxide particles were added to the beaker, and the beaker continued to be stirred at a constant temperature for about 2 h.

(3) 4 parts of hexamethyldisilazane were added to the beaker by a measuring cylinder, about 10 parts of an ethanol solution and 0.1 part of hydrophilic nano silicon dioxide particles with a particle size of about 7-40 nm were then added to the beaker, and the beaker was magnetically stirred for about 30 min.

(4) The solution prepared in the step (2) was dripped on the cleaned iron sheet that, after the coating film was uniform, was then placed in an oven to get dried at about 80° C. for about 30 min to evaporate the ethanol, thereby obtaining a hydrophilic film layer.

(5) After the iron sheet prepared in the step (4) was taken out, the solution prepared in the step (3) was also applied to the hydrophilic film layer by a drip coating method, and then the sample was placed in an oven at about 140° C. to get dried for about 60 min, thereby obtaining the hydrophilic-super-hydrophobic bipolar composite film of this example. Under such conditions, the ethanol on the surface of the sample volatilized, and the dehydration condensation between the hydrophilic layer and the substrate and between the hydrophilic layer and the hydrophobic layer formed a covalent bond, enhancing the ability of the super-hydrophobic surface to resist external forces.

Example 4

(1) A copper sheet that had been subjected to surface blasting was placed in a beaker so as to be placed in an ultrasonic cleaner to get cleaned ultrasonically at about 60 Hz in turn with ethanol, acetone and deionized water for about 10 min, and then it was washed with a mixed solution (pH=about 12) of sodium hydroxide and sodium nitrite as an alkali washing solution, and finally taken out to be blown dry by a dryer to get ready for use.

(2) 3.1 parts by weight of 2-(3,14-epoxycyclohexyl)ethyltrimethoxysilane were added to a beaker containing about 32 parts of an ethanol solution to undergo magnetic stirring in a water bath at a constant temperature of about 30° C. for about 1 h; the beaker was taken out of the water bath, 1 part of deionized water and then 3 parts of hexamethylenediamine were added to the beaker, and the beaker continued to be stirred in a water bath at a constant temperature until the solid was completely dissolved; the beaker was taken out, about 0.3 part of hydrophobic nano silicon dioxide particles were added to the beaker, and the beaker continued to be stirred at a constant temperature for about 2 h.

(3) 4 parts of hexamethyldisilazane were added to the beaker by a measuring cylinder, about 10 parts of an ethanol solution and about 0.05 part of hydrophilic nano silicon dioxide particles with a particle size of about 7-40 nm were then added to the beaker, and the beaker was magnetically stirred for about 30 min.

(4) The solution prepared in the step (2) was dripped on the cleaned copper sheet that, after the coating film was uniform, was then placed in an oven to get dried at about 80° C. for about 30 min to evaporate the ethanol, thereby obtaining a hydrophilic film layer.

(5) After the copper sheet prepared in the step (4) was taken out, the solution prepared in the step (3) was also applied to the hydrophilic film layer by a drip coating method, and then the sample was placed in an oven at about 140° C. to get dried for about 60 min, thereby obtaining the hydrophilic-super-hydrophobic bipolar composite film of this example. Under such conditions, the ethanol on the surface of the sample volatilized, and the dehydration condensation between the hydrophilic layer and the substrate and between the hydrophilic layer and the hydrophobic layer formed a covalent bond, enhancing the ability of the super-hydrophobic surface to resist external forces.

The above examples are exemplary embodiments of the present disclosure, but the embodiments of the present disclosure are not limited thereto, and any other alterations, modifications, substitutions, combinations and simplifications made without departing from the spirit and principle of the present disclosure should all be equivalent replacements and included in the scope of protection of the present disclosure.

What is claimed is:

1. A method for preparing a durable hydrophilic-super-hydrophobic bipolar self-cleaning composite film, characterized in that this method comprises the following steps:
   (1) adding an epoxy silane coupling agent into an organic solvent; after stirring and mixing well, adding an amine curing agent and distilled water; stirring for about 20-50 min and adding micron-sized solid particles and hydrophobic nano $SiO_2$ particles; continuing stirring for about 1-3 hours to obtain a hydrophilic layer solution;
   (2) adding a hydrophobic modifier and a hydrophilic nano $SiO_2$ particles into a second solvent, and stirring and mixing to obtain a hydrophobic layer solution; and
   (3) coating a pretreated substrate surface with the hydrophilic layer solution prepared in the step (1), performing heating treatment at about 60° C. to 80° C. for about 10-50 minutes; coating the surface with the hydrophobic layer solution obtained in the step (2), performing heating treatment at about 100° C. to 140° C. for about 50-90 minutes.

2. The method for preparing a durable hydrophilic-super-hydrophobic bipolar self-cleaning composite film according to claim 1, characterized in that: the epoxy silane coupling agent in the step (1) refers to an organosilane compound containing an epoxy group and at least one group selected from a methoxy group, an ethoxy group, a chloro group, and an acetoxy group; the organic solvent is at least one of methanol, ethanol, and isopropyl alcohol.

3. The method for preparing a durable hydrophilic-super-hydrophobic bipolar self-cleaning composite film according to claim 1, characterized in that: the amine curing agent described in the step (1) is at least one of octadecylamine, ethylenediamine, hexamethylenediamine, diethylenetriamine, and triethylenetetramine.

4. The method for preparing a durable hydrophilic-super-hydrophobic bipolar self-cleaning composite film according to claim 1, characterized in that: the micron-sized solid particles in the step (1) are at least one of micron-sized silicon dioxide, aluminum oxide, zinc oxide, and corundum.

5. The method for preparing a durable hydrophilic-super-hydrophobic bipolar self-cleaning composite film according to claim 1, characterized in that: the parts by weight of each material in the step (1) are as follows: about 2-5 parts of the epoxy silane coupling agent, about 20-50 parts of organic solvent, about 0.5-3 parts of the amine curing agent, about 0.5-3 parts of the distilled water, about 0-0.5 part of the micron-sized solid particles, and about 0.2-0.6 part of the hydrophobic nano $SiO_2$ particles.

6. The method of preparing a durable hydrophilic-super-hydrophobic bipolar self-cleaning composite film according to claim 1, characterized in that: the temperature is maintained in the range about 25° C. to 40° C. during the preparation of the hydrophilic layer solution in the step (1).

7. The method for preparing a durable hydrophilic-super-hydrophobic bipolar self-cleaning composite film according to claim 1, characterized in that: the hydrophobic modifier in the step (2) is at least one of hexamethyldisilazane, trimethylchlorosilane, dimethyldichlorosilane, methyltrichlorosilane, methyltrimethoxysilane, and methyltriethoxysilane; the second solvent is at least one of methanol, ethanol, propylene glycol, isopropanol, isobutanol, butanol, glycerin, and tetrahydrofuran.

8. The method for preparing a durable hydrophilic-super-hydrophobic bipolar self-cleaning composite film according to claim 1, characterized in that: the parts by weight of each material in the step (2) are as follows: about 2-6 parts of the hydrophobic modifier, about 10-50 parts of the second solvent, and about 0.05-0.3 part of the hydrophilic nano $SiO_2$ particles.

9. The method for preparing a durable hydrophilic-super-hydrophobic bipolar self-cleaning composite film according to claim 1, characterized in that: the substrate in the step (3) is selected from glass, iron, copper, aluminum, and cement; the pretreatment comprises ultrasonic cleaning in a mixture of ethanol and acetone followed by washing with deionized water and drying.

10. A durable hydrophilic-super-hydrophobic bipolar self-cleaning composite film, made in accordance with method of claim 1.

\* \* \* \* \*